US012693581B2

(12) United States Patent (10) Patent No.: US 12,693,581 B2
Gonzales et al. (45) Date of Patent: Jul. 28, 2026

(54) CAMERA RAIL POSITIONERS

(71) Applicants:David Christopher Gonzales, Long
Beach, CA (US); **Ronald Ray
Arredondo**, La Crescenta, CA (US)

(72) Inventors: David Christopher Gonzales, Long
Beach, CA (US); **Ronald Ray
Arredondo**, La Crescenta, CA (US)

( * ) Notice: Subject to any disclaimer, the term of this
patent is extended or adjusted under 35
U.S.C. 154(b) by 119 days.

(21) Appl. No.: 18/412,428

(22) Filed: Jan. 12, 2024

(65) Prior Publication Data

US 2024/0272526 A1 Aug. 15, 2024

Related U.S. Application Data

(60) Provisional application No. 63/576,059, filed on Jan.
13, 2023.

(51) Int. Cl.
| | |
|---|---|
| *G03B 17/56* | (2021.01) |
| *F16M 11/04* | (2006.01) |
| *F16M 11/20* | (2006.01) |
| *F16M 11/24* | (2006.01) |
| *F16M 11/38* | (2006.01) |
| *F16M 11/42* | (2006.01) |

(52) U.S. Cl.
CPC ......... *G03B 17/561* (2013.01); *F16M 11/048*
(2013.01); *F16M 11/2028* (2013.01); *F16M
11/24* (2013.01); *F16M 11/38* (2013.01);
*F16M 11/42* (2013.01); *F16M 2200/021*
(2013.01)

(58) Field of Classification Search
None
See application file for complete search history.

(56) References Cited

U.S. PATENT DOCUMENTS

| | | | | | |
|---|---|---|---|---|---|
| 1,855,964 | A | * | 4/1932 | Higginbotham ....... | F16M 11/10 |
| | | | | | 108/5 |
| 2,599,269 | A | * | 6/1952 | Markle .............. | F16M 11/2064 |
| | | | | | 248/404 |
| 3,533,583 | A | * | 10/1970 | Azim ..................... | F16M 11/24 |
| | | | | | 248/124.2 |
| 4,684,230 | A | * | 8/1987 | Smith ................... | F16M 11/08 |
| | | | | | 248/176.1 |
| 8,526,802 | B1 | * | 9/2013 | Starns ................... | G03B 15/02 |
| | | | | | 396/428 |
| 8,573,546 | B2 | * | 11/2013 | Valles ................... | F16M 11/28 |
| | | | | | 248/161 |
| 8,721,199 | B1 | * | 5/2014 | Hart ...................... | F16M 11/38 |
| | | | | | 396/428 |

(Continued)

FOREIGN PATENT DOCUMENTS

| | | | | | |
|---|---|---|---|---|---|
| CN | 103105233 | A | * | 5/2013 | |
| DE | 19939884 | A1 | * | 3/2001 | ......... F16M 11/2014 |

(Continued)

*Primary Examiner* — Rodney E Fuller
(74) *Attorney, Agent, or Firm* — James A. Italia; Italia IP

(57) ABSTRACT

Apparatuses serving as camera rail positioners and methods
of operation are featured and described, as well as methods
of their operation. The featured apparatuses include a hori-
zontal base having a plurality of wheels or casters, a vertical
tower in communication with and projecting upward from
the horizontal base, a vertical trolley designed for slidable
movement up and down a length of the vertical tower by an
actuator and configured to hold a camera rail system hori-
zontally.

3 Claims, 11 Drawing Sheets

(56)                    References Cited

U.S. PATENT DOCUMENTS

| | | | | |
|---|---|---|---|---|
| 10,968,086 | B1 * | 4/2021 | Tennant | .................... B66F 7/26 |
| 2006/0239677 | A1 * | 10/2006 | Friedrich | .............. F16M 11/08 |
| | | | | 396/419 |
| 2011/0008037 | A1 * | 1/2011 | Viggiano | .............. G03B 17/00 |
| | | | | 396/428 |

FOREIGN PATENT DOCUMENTS

| | | | | |
|---|---|---|---|---|
| WO | WO-2007145542 A1 * | 12/2007 | ............. | G03B 17/56 |
| WO | WO-2012068675 A1 * | 5/2012 | ............. | G03B 37/02 |

* cited by examiner

CAMERA RAIL POSITIONERS

CROSS-REFERENCE TO RELATED APPLICATIONS

The present application relies on the disclosure of and claims priority to and the benefit of the filing date of U.S. Provisional Patent Application No. 63/576,059, filed Jan. 13, 2023, which is hereby incorporated by reference in its entirety.

FIELD

The present disclosure is directed to positioning devices. More specifically, the present disclosure provides devices that transport or position a camera rail system horizontally or vertically as well as provide tilt or roll, and methods of their operation.

BACKGROUND

In the motion picture industry and related fields, cameras are used to capture moving images. Often, it suits the needs of the "Filmmakers" (or cinematographers) to have the camera moving as it captures said images, and a variety of means have been devised to move the cameras, both motorized and human powered.

As far as human powered camera movement goes, cameras may be rolled and/or lifted on camera dollies, raised and panned on camera cranes and jibs, and smoothly walked through a shot using stabilizers such as steadicams or bungee rigs.

Each of these methods has advantages and disadvantages. Dollies tend to be heavy and expensive and require several crew members to handle, as they often ride on metal tracks. Cranes are large, cumbersome, slow to set up, and expensive. Steadicams require specialized operators, are difficult to focus, and are expensive to rent or purchase.

Given the high cost of most camera moving equipment, a new, more affordable solution has become very popular within the last decade. While there are a variety of brand names and regional names exist, I'll refer to this device as a "Rail Dolly".

A rail dolly is simply a small platform with wheels on the bottom, said wheels configured so as to easily ride upon two parallel pieces of metal or plastic tubing or pipe. These rails are generally joined by a bracket at either end, each bracket generally being equipped with a means of being mounted onto lighting stands. The top of said platform would be fitted with a means of mounting a standard pan-tilt head onto it, with a camera then placed on top of that.

Unlike regular camera dollies, only a camera, and not an operator rides on the rail dolly. The camera would be operated by someone standing next to the rails, sliding the camera back and forth as they panned and tilted the camera to achieve the desired shot.

To achieve various heights, the rail dolly would be raised and lowered on lighting stands, a fairly cumbersome operation that usually requires at least two people. For lower heights, below the range of lighting stands, the dolly rail assembly would usually be placed on a series of wooden plates, boxes or blocks to achieve certain heights and to be made level.

As the weight of a camera system, often approaching a hundred pounds, is enough to flex the rail assembly, (which tilts the camera and can ruin shots), rail dollies are rarely built longer than 12 feet.

One other solution is a camera slider. A camera slider is generally a metal plate, anywhere from 2 to 8 feet in length, fitted with a set of rails. A trolley, equipped with linear bearings or wheels slides on these rails, said trolley carrying the camera, much as a rail dolly carries a camera. Camera sliders are generally mounted on tripods or camera dollies, so are designed to be mounted in the center, whereas rail dollies are designed to be mounted from either end.

Both the rail dolly and the camera slider provide similar capabilities—smooth, repeatable, precise movements of limited length. Neither of these devices raises or lowers the camera by itself.

While both of these systems are useful and popular, they both have weaknesses. To raise or lower the height of a rail dolly requires 2-3 people, and usually the removal of the camera from the system. Also, wooden boxes and blocks must be provided for lower heights, and height adjustment can be quite time consuming. Also, rail dolly assemblies are difficult to move, especially on rougher terrain, and usually require disassembly and reassembly between positions.

Sliders, when mounted to tripods, have all of these problems as well. When sliders are mounted to hydraulic or electric boom equipped dollies, they are easier to move, and far easier to adjust the height, but at the expense of having the operator struggle to step over and around a large dolly, which generally forces said operator to operate the slider from one side or the other, reaching and leaning to operate the far side of the device.

SUMMARY

The disclosure features various implementations of an apparatus designed as a camera rail positioner or components of such camera rail positioning apparatuses. The disclosure also features methods of operating such apparatuses.

In general, in a first aspect, the disclosure features an apparatus. The apparatus includes a horizontal base having a plurality of wheels or casters, a vertical tower in communication with and projecting upward from the horizontal base, and a vertical trolley designed for slidable movement up and down a length of the vertical tower by an actuator and configured to hold a camera rail system horizontally.

In general, in a second aspect, the disclosure features an apparatus. The apparatus includes a trolley providing vertical movement of a camera rail system, the trolley including a first plate designed for vertical movement along a vertical tower, a second plate attached to an end of the camera rail system and mounted pivotally to the first plate by a bolt on the trolley passing through an arced slot disposed through the second plate which provides a roll axis by which roll motion of the camera rail system is translated through the arced slot, the roll motion limited by either end of the arced slot, and a fastener designed to lock on the bolt and fix the camera rail system on a desired position on the roll axis.

In general, in a third aspect, the disclosure features an apparatus. The apparatus includes a tiltable platform adjustable by means of a turnbuckle or a ratcheting load binder, and a camera rail system mounted on the tiltable platform.

In general, in a fourth aspect, the disclosure features an apparatus. The apparatus includes a base designed to support a camera rail system, a plurality of casters in communication with risers projecting vertically therefrom, wherein the casters are mounted to the base by way of sleeves disposed in the base which receive the risers, the risers capable of vertical slidable movement within the sleeves such that the casters remain in contact with the ground when the base is on uneven terrain.

In general, in a fifth aspect, the disclosure features an apparatus. The apparatus includes a camera rail positioner, the camera rail positioner capable of switching between a rail-clamping system and a camera rail system chosen from a rail dolly and a camera slider.

In general, in a sixth aspect, the disclosure features an apparatus. The apparatus includes a base designed to support a camera rail system and having a first set of wheels or casters, one or more legs pivotably attached to the base and capable of being folded in a vertical position or a horizontal position, and a second set of wheels or casters comprising one or more wheels or casters mounted to ends of the one or more legs.

In general, in a seventh aspect, the disclosure features an apparatus. The apparatus includes a pair of horizontal members disposed parallel to each which serve as a base of the apparatus, a vertical tower in communication with and projecting upward from one or both of the pair of horizontal members, a fixed rail assembly comprising a pair of rails in parallel to each other and one or more struts connecting the pair of rails perpendicularly, a vertical trolley designed for slidable movement up and down a length of the vertical tower by an actuator, the vertical trolley having one or more slots which are designed to receive the one or more struts of the fixed rail assembly and hold the fixed rail assembly vertically.

In general, in an eighth aspect, the disclosure features an apparatus. The apparatus includes a camera rail system having a support attached to a first end and being unsupported at an opposing end, the opposing end having one or more telescoping poles or stands capable of stabilizing the camera rail system during use.

In general, in a ninth aspect, the disclosure features an apparatus. The apparatus includes a base having or more casters capable of pivotal movement that allows the base to change direction when pushed, a locking system designed to engage the one or more casters and limit the pivotal movement of the one or more casters, wherein the locking system includes a pair of side plates, a pair of bolts designed to pass through the side plates, and a pair of wing nuts designed to secure ends of the bolts, wherein during use the side plates are disposed on either side of the caster and entrap the caster to limit the pivotable movement of the caster.

In general, in a tenth aspect, the disclosure features a method. The method includes operating a camera rail positioner designed to adjust horizontal position, vertical position, tilt, and roll of a camera rail system.

Features of the apparatuses and methods can include the following. The horizontal base can include a pair of horizontal members disposed parallel to each other. The vertical trolley can hold the camera rail system in a manner that provides for limited roll motion of the camera rail system along a horizontal axis of the camera rail system. A plurality of casters can be attached to the horizontal base, the casters configured for vertical movement and pivotable movement relative to the horizontal base. The apparatus can include a locking system which is designed to limit the pivotable movement of one or more casters during use. The apparatus can include one or more legs pivotably attached to the base that are foldable in a vertical stowed position and a horizontal mobile position, the one or more legs having one or more casters. The apparatus can include a tongue or platform attached to the vertical trolley perpendicularly by way of a load binder, the tongue or platform capable of supporting a load of the camera rail system. The apparatus can include a clamp attached to the tongue or platform designed to accommodate ends of horizontal rails of the camera rail system and tighten down on the ends during use, wherein the pair of horizontal rails are attached to the vertical trolley by way of the clamp. The apparatus can include a tongue or platform attached to the vertical trolley perpendicularly by way of a load binder, the tongue or platform designed to attach and support a camera slider. The apparatus can include one or more slots disposed on the vertical trolley designed to receive the one or more struts of a fixed camera rail system. The one or more slots can be provided by forked members extending vertically from the vertical trolley. The apparatus can include a camera rail system attachable to the trolley at a first end, wherein an opposing end of the camera rail system has one or more telescoping poles or stands capable of stabilizing the camera rail system during use. The one or more legs can extend from the base when folded in the horizontal position thereby increasing the length of the base. The actuator can be a winch, jack, hydraulic or pneumatic cylinder, drive screw or motor. The camera rail system can be a rail dolly or a camera slider.

It should be understood that the apparatuses and methods are not to be considered limitations on the invention defined by the claims. The featured apparatuses and methods can be implemented in one or more ways using one or more features depicted in the drawings, described in the detailed description, and set forth in the claims.

BRIEF DESCRIPTION OF THE DRAWINGS

The accompanying drawings illustrate certain aspects and principles of the implementations set forth, and should not be construed as limiting.

DETAILED DESCRIPTION

Figures 1A, 1B:
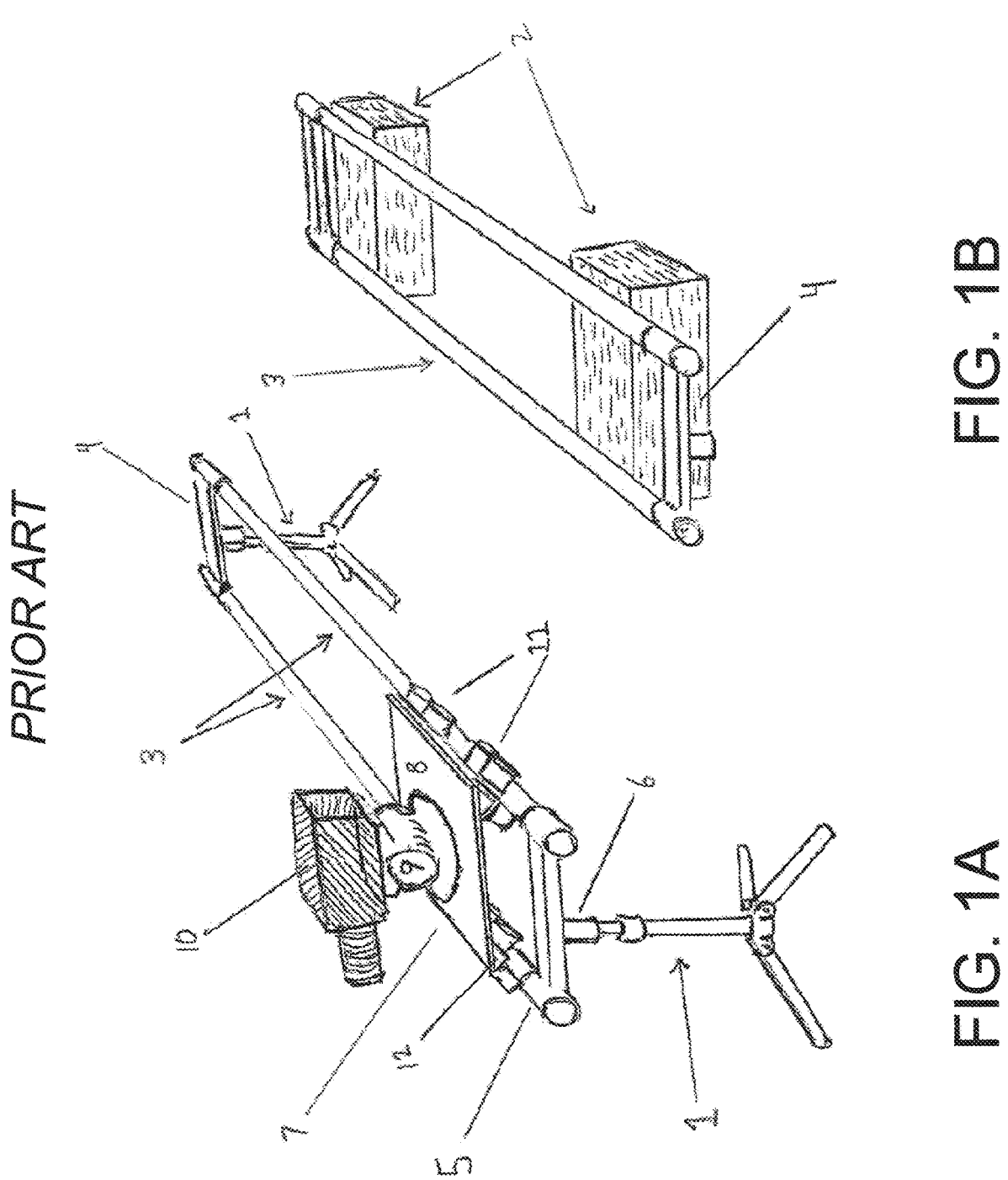
FIGS. 1A and 1B are drawings depicting rail dollies in two standard configurations, with FIG. 1A showing the rail dolly on lighting stands and FIG. 1B showing the rail dolly mounted on wooden boxes.

Reference will now be made in detail to various illustrative implementations. It is to be understood that the following discussion of the implementations is not intended to be limiting.

The present disclosure provides positioning devices designed to carry a camera rail system such as a rail dolly or a slider, to be maneuverable across smooth or rough terrain, to easily raise or lower the camera, and to be easily leveled and stabilized, all while operated by only one person. The positioning devices allow for the positioning of a camera rail system (Rail Dolly System or Camera Slider) by having casters that allow for easy transport, allows for the positioning at various heights by virtue of a jack or winch that raises a trolley which holds the sliding camera system, allows the stabilizing of the unit by the use of adjustable wheel risers which raise and lower the casters so as to keep all four corner casters firmly on the ground, and allows the leveling of the sliding camera system (which can only operate properly when perfectly level) by virtue of separate devices that allow leveling on a roll axis and leveling (from one end, which is unusual in this field) on a tilt axis.

One implementation provides a camera rail lifting system that raises and lowers the camera rail system from one end, by raising and lowering a trolley which is actuated by a winch, jack, hydraulic or pneumatic cylinder, drive screw or motor.

Another implementation provides a camera rail leveling system, which levels the camera rail system on a roll axis, by virtue of mounting said rail system to a plate (perpendicular to the length of the rail system) that is mounted pivotably to a vertical trolley, said roll adjustability limited by a bolt passing through an arced slot, with the roll motion stopping when the bolt contacts the end of the arced slot, and the entire system being lockable in any position of roll by having a nut tightened on the bolt engaging said arced slot.

Another implementation provides a camera rail leveling system having a camera rail system mounted on a tilting plate, said tilting plate adjustable by means of a turnbuckle or a ratcheting load binder.

Another implementation provides a camera rail positioner which is equipped with casters, said casters mounted to risers, said risers sliding vertically in sleeves (and lockable in place) so as to keep all the wheels on the ground when the unit is on uneven terrain.

Another implementation provides a camera rail positioner which has the ability to switch from a rail-clamping system to an industry standard camera mount so as to allow the use of camera rail systems (such as camera sliders) that are mounted using standard camera mounts.

Another implementation provides a camera rail positioner which may have folding legs and an intermediate set of wheels, such that it may easily be moved in a folded, inoperable condition on the rear wheels and intermediate wheels, but upon deploying the folding legs, the entire unit increases in length (enhancing stability) and would then be maneuverable with the use of the wheels or casters mounted to the ends of the folding legs.

Another implementation provides a camera rail positioner with a slotted fork for holding a camera rail assembly vertically for ease of transport or storage.

Another implementation provides a camera rail system, which is fully supported from one end, yet stabilized by one or more telescoping poles or stands, attached to the unsupported end, and used strictly for stabilization.

Another implementation provides a camera rail positioner, equipped with a temporarily engageable means for limiting the rotational travel of one or more casters, so as to render the system more controllable when being pushed across uneven or unlevel surfaces.

Turning now to the Drawings, FIGS. 1A and 1B shows rail dollies in two standard configurations. The rail dolly system is shown in two different configurations, being the high configuration mounted on lighting stands (1) in FIG. 1A and a low configuration mounted on wooden boxes (2) in FIG. 1B. A rail dolly system is comprised of a set of rails (3) (generally made of pipe or round tubing, though other long rigid items, such as lengths of angle iron, may be used. All drawings will feature the typical tubing), which are held together by a pair of end brackets (4), each end bracket (4) equipped with a pair of clamps (5) (tubular in FIG. 1A) designed to firmly hold the rails parallel and horizontal. The end brackets (4) are also usually equipped with a receiver (6) which can be fitted to the top of a lighting stand (1), to hold the rail assembly firmly to the stand (1), so as to allow the assembly to be lifted and lowered by adjusting the height of the lighting stand (1).

Note that lighting stands (1) provide a limited range of heights. Because of this, to bring the rail assembly to a lower height, the rail assembly may be placed on the ground, or be set upon objects, such as the wooden boxes (2) typically used in the movie industry, shown in FIG. 1B.

Completing the rail dolly system is the Rail Dolly (7), which includes a horizontal plate (8), said plate generally equipped with fittings or holes for the attachment of a pan-tilt head (9), which can hold a camera (10). Each horizontal plate (8) is equipped with wheels (11). In FIG. 1A, the wheels (11) are shown mounted to a bogey (12), each of the 4 bogeys (12) holding 4 wheels (11) at a 45 degree angle to the rails (3), so as to keep the wheels engaged to the rails (3) with no possibility of the rail dolly (7) falling off the rails (3).

Note that this "wheels mounted diagonally to 4 bogeys" configuration is common, but other configurations, such as the use of grooved wheels to engage with the rails (3) are also used.

In use, the rail dolly system can be operated by rolling the rail dolly (7) back and forth on the rails (3) while panning and tilting the camera (10) by taking advantage of the articulated mount provided by the pan-tilt head (9)

Figure 2:
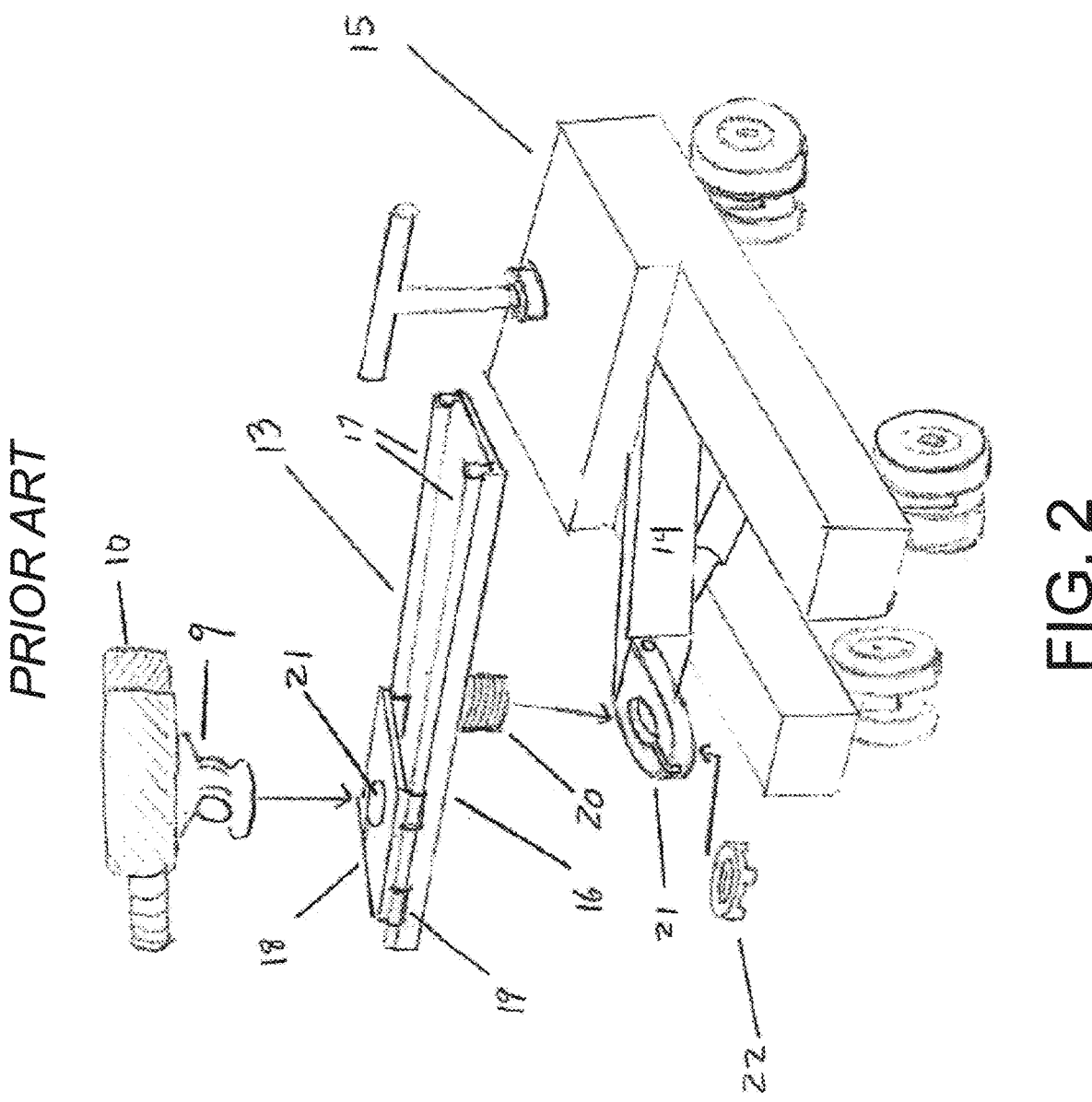
FIG. 2 is a drawing showing a camera slider mounted to a hydraulic crab dolly.

FIG. 2 shows a camera slider (13) mounted to a hydraulic crab dolly (15). In FIG. 2, we see a common movie industry mobile camera platform configuration. The camera (10) is mounted to a pan-tilt head (9), which is, itself, mounted to a camera slider (13), said camera slider (13) being mounted to the hydraulic boom (14) of a camera dolly (15).

The camera dolly (15) is a wheeled, highly maneuverable cart, usually equipped with a hydraulic boom arm (14) capable of raising the camera (10) up and down.

The camera slider (13) is comprised of a base plate (16), to which 2 linear rails (17) are attached. A trolley plate (18) slides back and forth on the linear rails (17), sliding easily because it's equipped with linear bearings (19), which engage with the linear rails (17).

Note the large, threaded Mitchell Bolt (20) attached to the bottom of the slider (13). The Mitchell Bolt (20) engages with a Mitchell Mount (21) which is attached to the end of the hydraulic boom (14). (Note that the Mitchell Mount (21) is comprised of a through hole and a key-way). A Castle Nut (22) is used to lock the slider (13) to the Mitchell Mount (21) by fastening the Mitchell Bolt (20).

Note that the trolley plate (18) is also equipped with a Mitchell Mount (21).

In use, this system can easily move the camera (10) around on smooth, flat ground. The hydraulic boom (14) can then be used to raise or lower the camera (10) to the desired height. The slider (13) can then be used to move the camera (10) back and forth during the shot. While this configuration offers a high level of mobility, it is expensive, very heavy, and difficult to move on uneven terrain. Also, the camera operator often has to operate the camera (10) while awkwardly reaching over the dolly (15).

Figure 3:
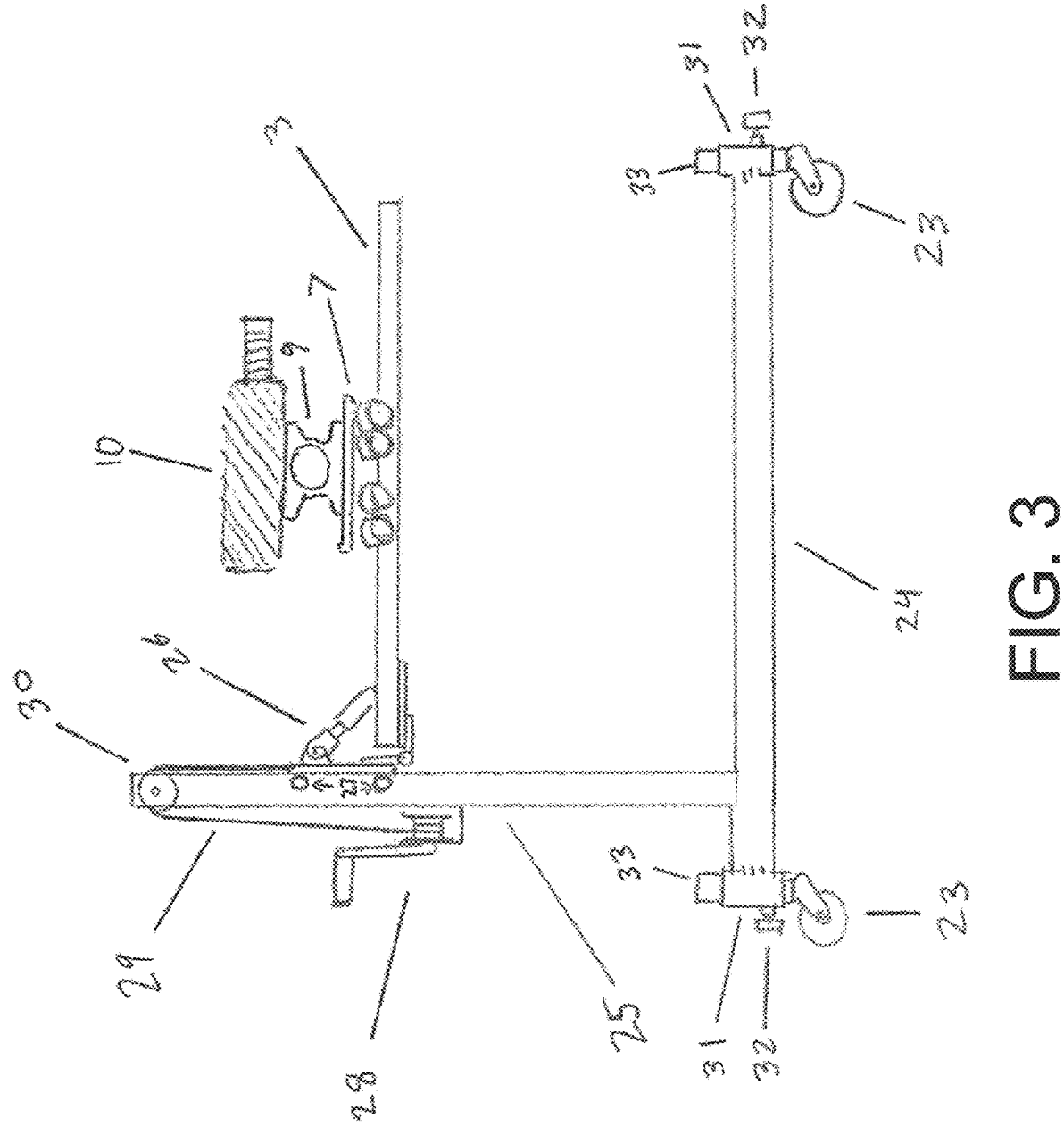
FIG. 3 is a drawing depicting a positioning device (camera rail positioner) according to one implementation.

FIG. 3 depicts a side view of a positioning device according to one implementation, which herein will be referred to as a "Camera Rail Positioner", or "CRP". The CRP is a wheeled device, similar to "stackers" and manual powered forklifts used in warehouses. Equipped with at least four casters (23) (one on each corner), the CRP is designed to easily roll on a variety of surfaces. The base of the CRP includes two members or legs (24) (note that the legs are horizontal, parallel to each other. Only one is visible in FIG. 3), and between the legs (24) is a vertical tower (25), this vertical tower (25) usually made of some form of rail or tubing so that wheels or bearings can roll up and down this structure. However, other configurations of the base are possible, including a horizontal frame or platform.

A vertical trolley (26) equipped with rollers (27) (or wheels or bearings) is attached to the tower (25) in such a way as to be easily slidable up and down the height of the tower (25). Some means of pulling or pushing the vertical trolley (26) is included. In FIG. 3, we show a winch (28), which pulls a cable (29) over a pulley (30), said cable (29) then raising and lowering the vertical trolley (26). (NOTE: while we're using a winch in FIG. 3, other implementations of the CRP can use other systems such as a hydraulic jack, mechanical jack, acme screw or electric motor or other actuator to raise and lower the vertical trolley (26). We'll continue to use the winch variant to simplify the drawings)

Note that a variety of features (including a hinge and a turnbuckle) are visible on the vertical trolley (26) but will not be discussed until shown in greater detail on another, more detailed drawing.

The rails (3), similar to the rails used in any rail-dolly-system, are shown here, mounted to the vertical trolley (26), in such a way as they can be lifted and lowered by lifting and lowering the vertical trolley (26) by way of the winch (28).

A rail dolly (7) is shown mounted to the rails (3), with a pan-tilt-head (9) and camera (10) attached.

Looking to the ends of the legs (24) we see a caster assembly on each corner. Each of these consists of a caster (23) mounted to a wheel riser (33) which is a length of pipe or tubing, or possibly solid metal rod. This wheel riser (33) is capable of raising or lowering as it passes through a sleeve (31) attached to either end of the leg (24). A tightening knob (32) can be used to lock the caster (23)/wheel riser (33) assembly at a variety of heights.

Figure 4:
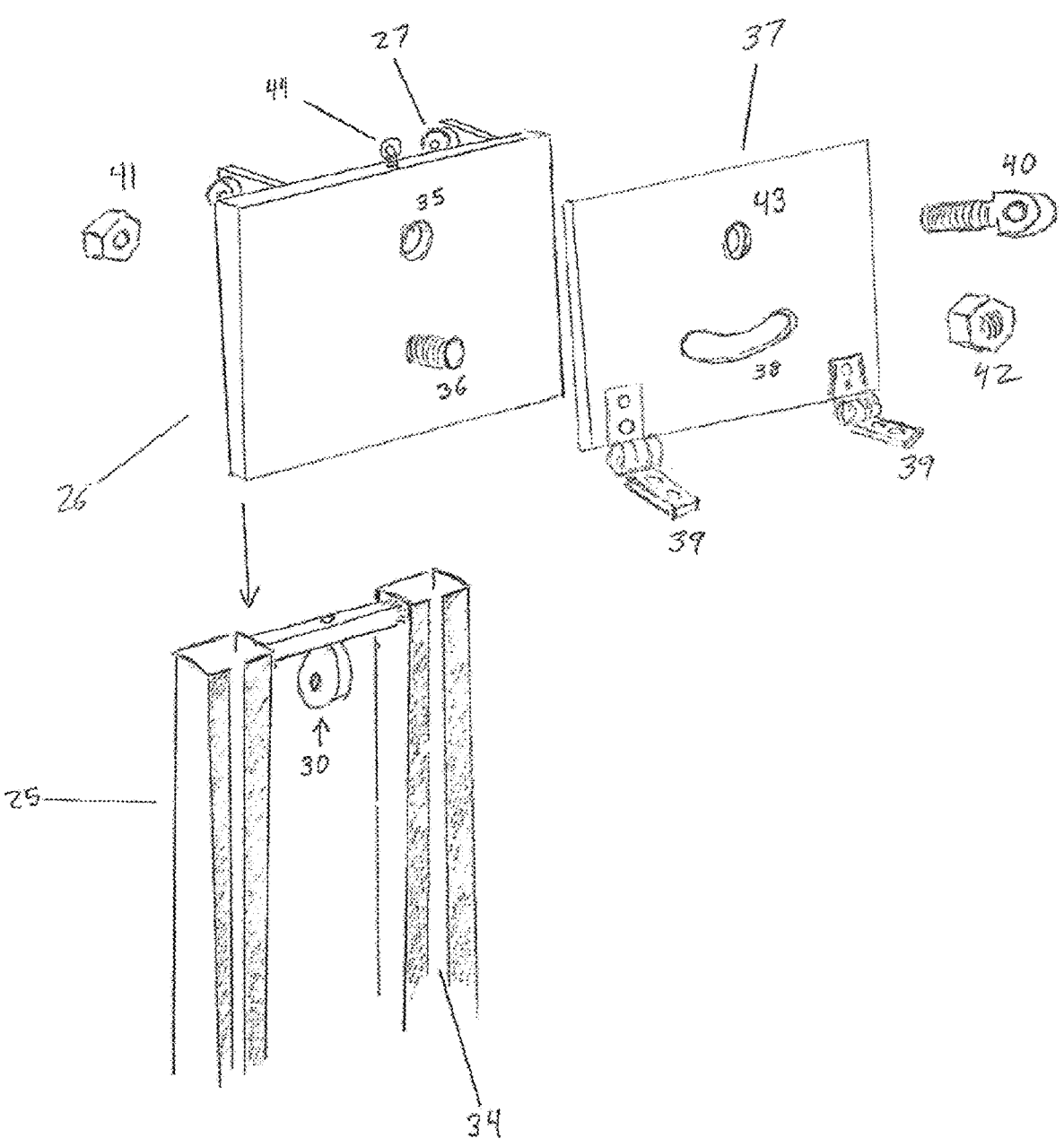
FIG. 4 is a drawing providing a detailed depiction of a roll leveling feature on a vertical trolley according to one implementation.

FIG. 4 provides a detailed depiction of the roll leveling feature on the vertical trolley. The vertical trolley (26) is a plate equipped with rollers (27) which slide on the tower (25). Note the slots (34) in the tower (which engage with the rollers (27). The vertical trolley (26) features both a hole (35) and a threaded stud (36).

The roll plate (37) is a metal plate, roughly the size of the vertical trolley (26). It features a hole (43) (which lines up with, and is the same size as, hole (35) on the vertical trolley (26), and an arced slot (38), which bends upwards at both ends, and which lines up with, and is the same width as, the vertical trolley stud (36). Note the hinges (39) mounted to the bottom corners of the roll plate (37).

A clevis end bolt (40) will pass through holes 43 and 35, where it will be locked in place by a nut (41).

Another nut (42) will attach to the trolley stud (36) after it has passed through the arced slot (38).

Note the placement of the pulley (30) at the top of the tower (25). Also note the eyebolt (44) at the top of the vertical trolley (26)

Figure 5:
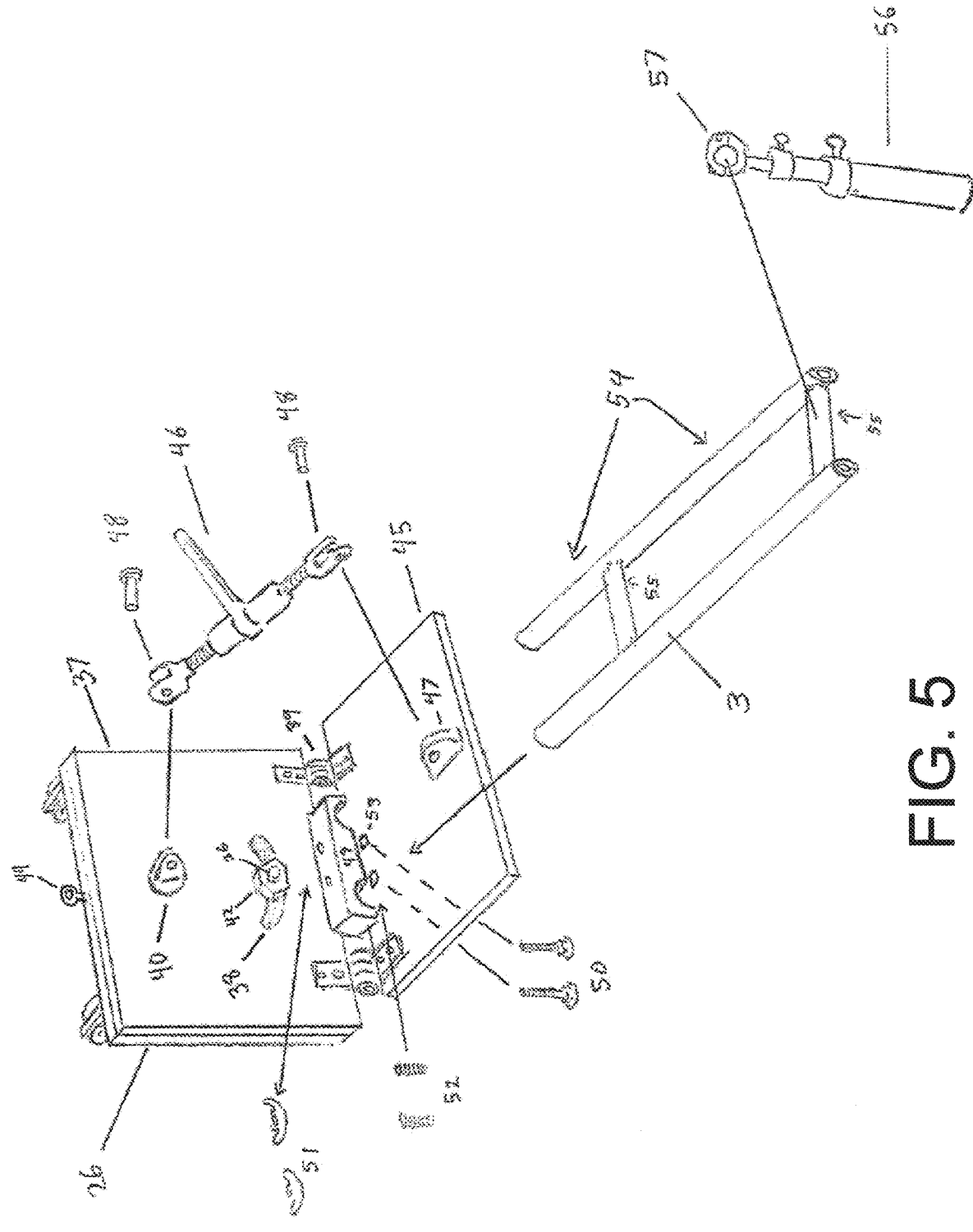
FIG. 5 is a drawing providing a detailed depiction of leveling capability and rail assembly mounts of a complete trolley assembly according to one implementation.

FIG. 5 provides a detailed depiction of leveling capability and Rail Assembly mounts. The complete trolley assembly is shown, including the vertical trolley (26), with the roll plate (37) mounted to it in such a way as to be able to roll (on a limited arc) clockwise and counter clockwise, by pivoting on the clevis end bolt (40) while being limited in travel by the vertical trolley stud (36) which acts as a stop on either end of the arced slot (38). The stud nut (42) can tighten or loosen so as to lock the roll or allow it.

An additional plate serving as a platform or tongue (45) is tiltably mounted to the roll plate (37) by a pair of hinges (39). The Tongue (45) is also connected to the trolley assembly by a load binder (46), said load binder being a turnbuckle equipped with a ratcheting lever. (Note that a simple turnbuckle could also be used). The Load Binder (46) attaches to the vertical trolley (26) and the Roll Plate (37) by engaging with the Clevis End Bolt (40) which transfixes both of these. The other end of the load Binder (46) attaches to the Tongue (45) via the Clevis Mount (47) which projects from the Tongue (45).

The pivotable connections at either end of the Load Binder (46) are secured with Clevis Pins (48).

The tongue (45) is equipped with a rail clamping device which is comprised of a rail clamp (49) being a jaw with cut-outs of a size and shape so as to accommodate the ends of the rails (3) on the Rail Assembly (54).

The Rail Clamp (49) can be tightened by turning a pair of wing nuts (51) which engage a pair of Carriage Bolts (50), said bolts passing through the Tongue (45) and being unable to rotate by virtue of engaging with a set of square holes (53). The Wing Nuts (51) accomplish the tightening action by, when rotated, traveling downwards on the carriage bolts (50) and pushing the rail clamp (49) down onto the ends of the rail assembly (54).

Note that it may be advantageous to hold the Rail Clamp (49) open until clamping is required, so a pair of springs (52) may be installed over the carriage bolts (50), between the upper surface of the tongue (45) and the lower surface of the Rail Clamp (49).

The Rail Assembly (54) is a fixed structure comprised of the two rails (3) such as are used in most rail dolly systems, but different as the rails (3) are joined immovably by a pair of struts (55).

A final feature of this system is an expanding pole (56) which can be mounted to the end strut (55) by any variety of means, such as bolts or clamps such as clamp (57), in such a way as to be easily removable, or pivotable so as to allow the rail to be raised or lowered without the expanding pole (56) blocking this movement.

Figure 6:
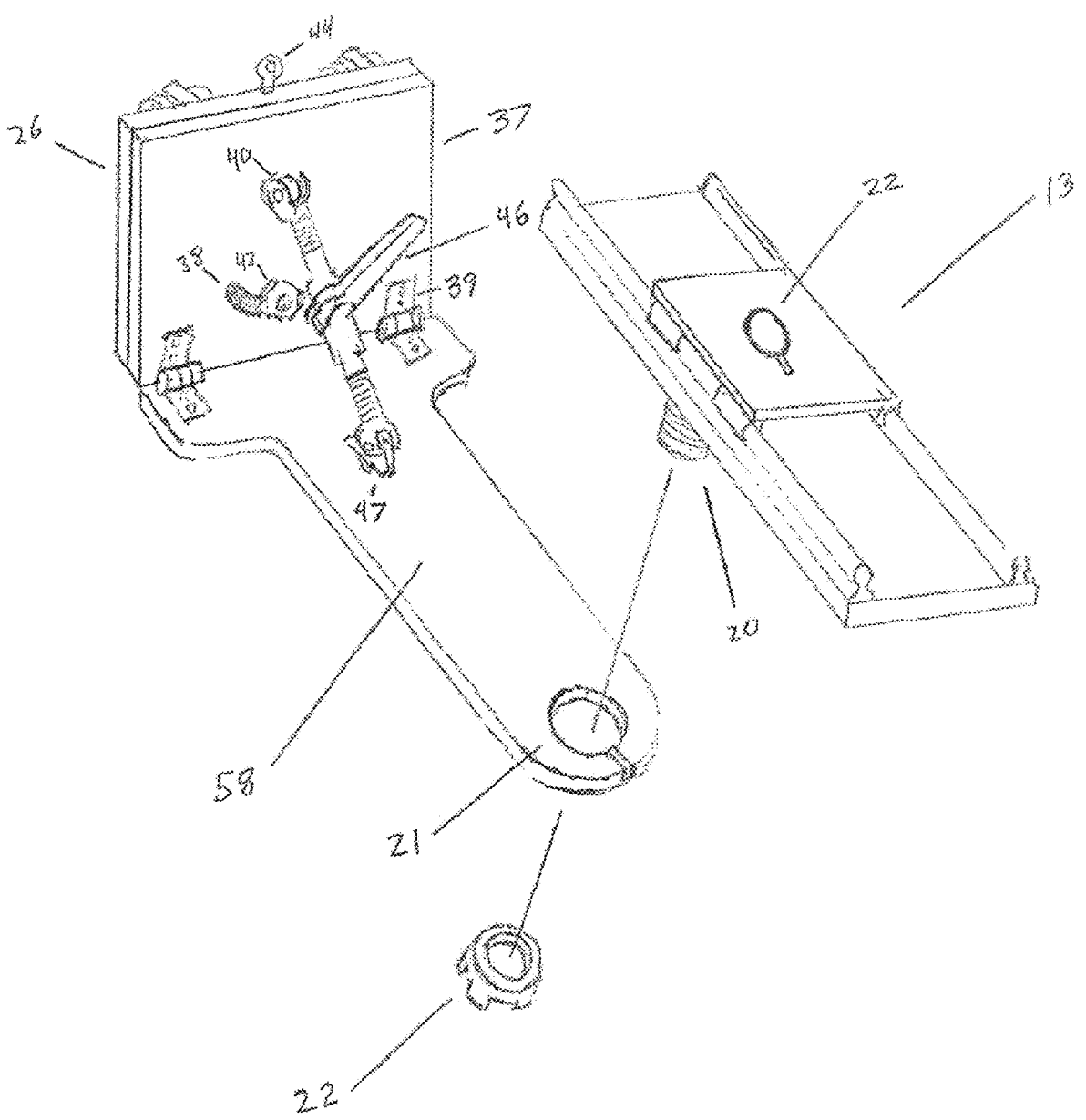
FIG. 6 is a drawing depicting detail of a Mitchell Mount equipped tongue variant for carrying camera sliders according to one implementation.

FIG. 6 depicts detail of a Mitchell Mount equipped tongue variant for carrying camera sliders. A trolley assembly is shown similar to the one depicted in FIG. 5, except the tongue (45) has been replaced with a Mitchell Tongue (58). This is simply a longer tongue, lacking rail clamps, significantly longer, and equipped with a Mitchell Mount (21) at the far end.

Note the Camera Slider (13) which mounts onto the Mitchell Mount (21) at the end of the Mitchell Tongue (58). The Camera Slider (13) is secured by tightening the Castle Nut (22) onto the Mitchell Bolt (20).

Note that a Mitchell plate (not drawn) could simply be mounted to the rail system (54) to achieve a similar slider-mounting capability.

Figures 7A, 7B:
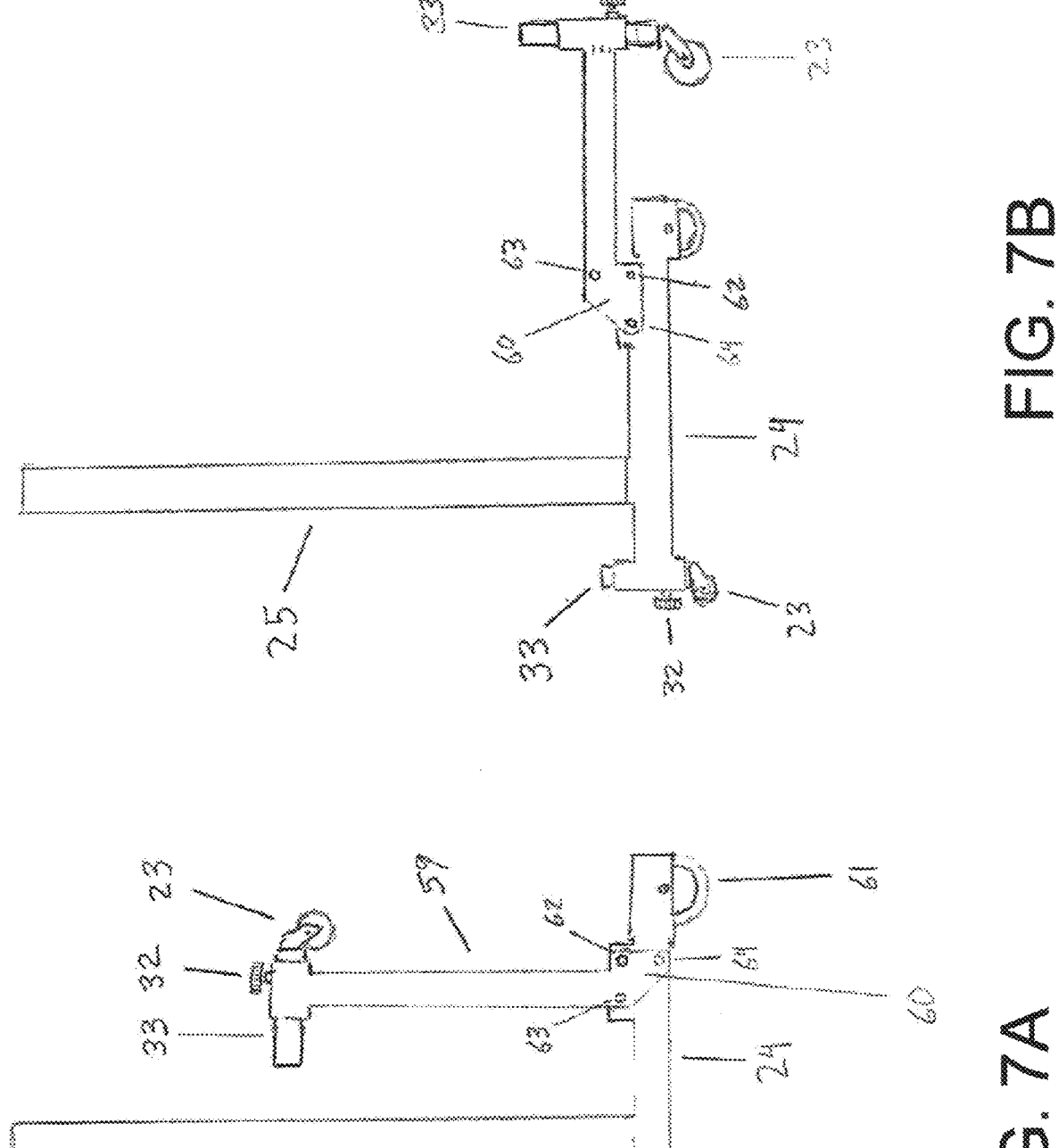
FIGS. 7A and 7B are drawings depicting a folding leg according to two implementations, one with folded legs (FIG. 7A), and one with legs fully deployed (FIG. 7B).

FIGS. 7A and 7B depict a folding leg according to two implementations, one with folded legs (FIG. 7A), and one with legs fully deployed (FIG. 7B). Note also, that for simplicity, the winches and trolleys as well as camera rail assemblies have been removed from FIGS. 7A and 7B.

For ease of transport and storage, some implementations of the CRPs can have folding legs. The main legs (24) of the CRP will be shorter in this implementation, and the shortened ends will be equipped with Transport Wheels (61). A folding leg (59) is mounted to the shortened leg (24), mounted pivotably on a pin (not shown) that passes through a Pivot Hole (62). The Folding Leg (59) is attached to a flange (60) that holds 3 mounting holes—the pivot hole (62), the raised leg locking hole (63) and the deployed leg locking hole (64).

In FIG. 7A, the folding leg (59) is raised, held in place by the pin through the pivot hole (62) and a pin through the raised leg locking hole (63).

FIG. 7B shows the CRP with the folding leg (59) deployed, held in place by the pin through the pivot hole (62) and a pin through the deployed leg locking hole (64). Note that variants with removable legs are also possible.

When the folding leg (59) is vertically folded as shown in FIG. 7A, the base is less stable, but more maneuverable and easier to store. The configuration in which the folding leg or legs are folded into a vertical position can generally be used for storage (because of a smaller footprint), transporting the device on a truck or similar conveyance (because the smaller footprint makes it easier to fit into a vehicle) or when transiting the device at some location where its length might make it more difficult to maneuver. Folding the leg (59) in the horizontal position as shown in FIG. 7B increases the stability of the CRP during use of the CRP.

Figure 8:
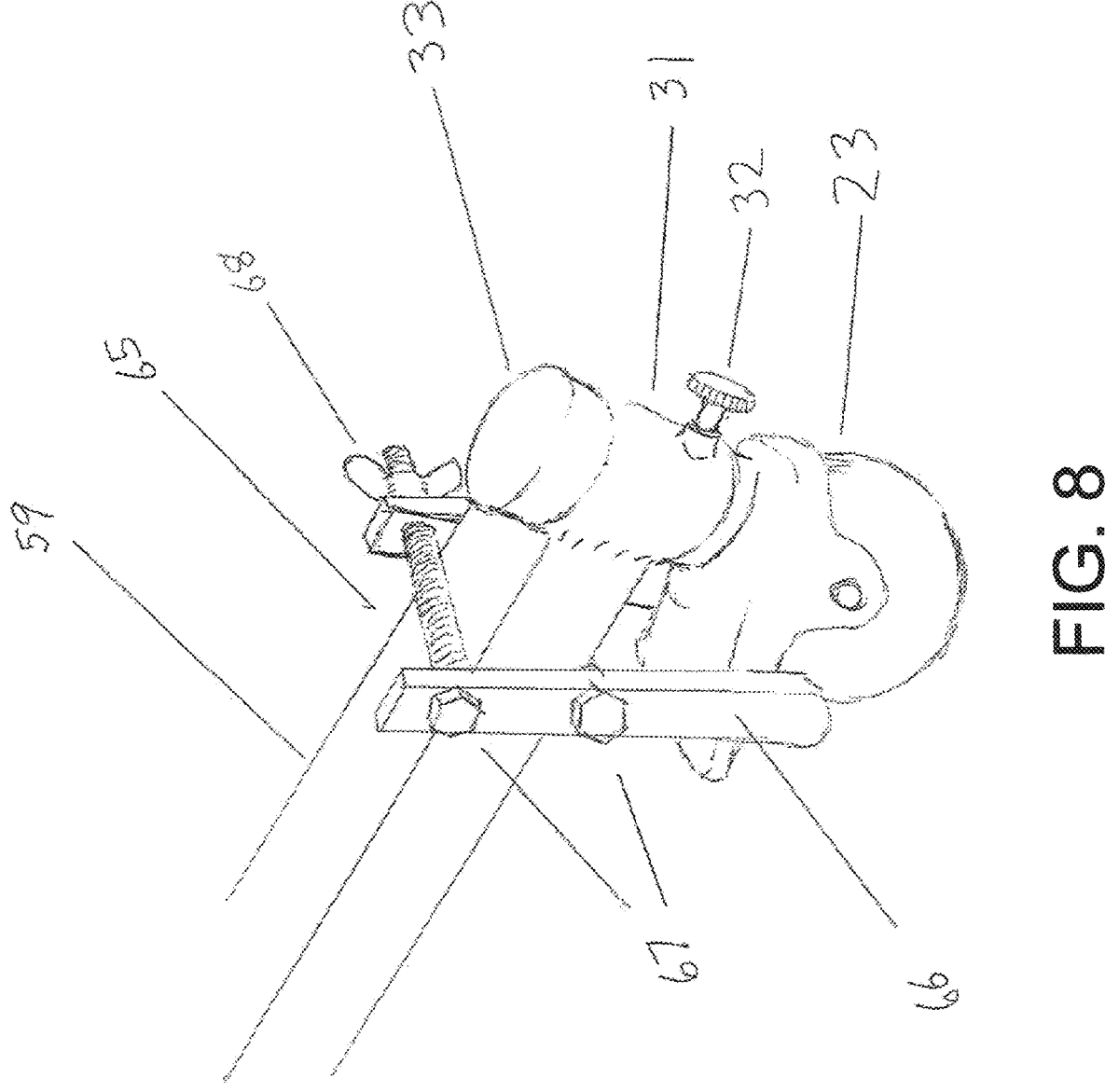
FIG. 8 is a drawing depicting a caster pivot lock according to one implementation.

FIG. 8 depicts a caster pivot lock according to one implementation. The device can often use extendable wheel risers terminating in casters, which, for transport, can help the operator control the path of the rolling unit if one or more of the casters could be pivotably locked so as to allow the unit to be pushed in a predictable path. As the extending (and retracting) legs can make it difficult to use position-locking casters, a leg-mounted clamp, which can be easily engaged and disengaged from the casters is called for.

In FIG. 8, we see one of the legs (59) which terminates in a vertical sleeve (31). The sleeve (31) holds the wheel riser (33) which terminates in the caster (23). The wheel riser (33) can slide vertically in the sleeve (31) so as to adjust the height of the caster (23) so as to steady the CRP on unlevel ground. The wheel riser (33) is locked into a position by the knob (32).

Note the Caster Pivot Lock (65) which is a simple device comprised of a pair of Pivot Lock Side Plates (66), a pair of Pivot Lock Bolts (67) and a pair of Pivot Lock Wing Nuts (68).

When the CRP is being used, the Caster Pivot Lock (65) may be stored to the rear of the Leg (59), away from the caster (23). This allows the CRP to be moved in various directions, as all four casters (23) are free to move in any direction. However, when the CRP is being transported any distance, especially over uneven terrain, it may be advantageous to limit the travel of the front caster (23), limiting said movement providing a higher level of control to whoever is pushing the CRP.

To use the Caster Pivot Lock (65), the operator loosens the Pivot Lock Wing Nuts (68), then slides the entire Caster Pivot Lock (65) forward until the Pivot Lock Side Plates (66) are positioned to either side of the Caster (23). At this point, the operator can tighten the Pivot Lock Wing Nuts (68), tightening the Pivot Lock Side Plates (66) against the leg (59) (which would lock the entire Caster Pivot Lock in place) and trapping the Caster (23) in place, which would allow the wheel to roll, but would not allow the Caster (23) to pivot, meaning the CRP would then only be capable of being steered from the rear.

Figure 9:
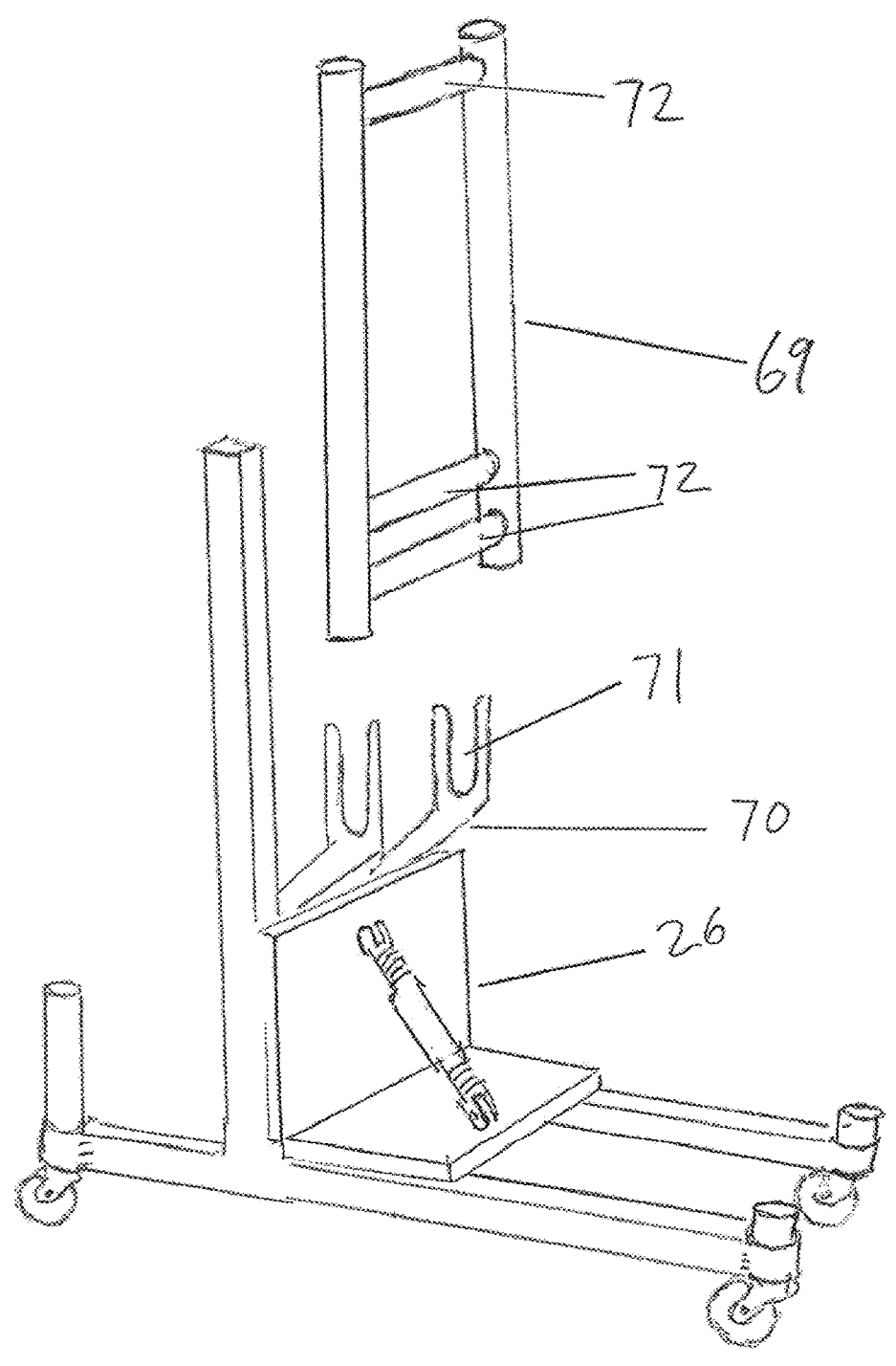
FIG. 9 is a drawing depicting rail rack forks according to one implementation.

FIG. 9 depicts rail rack forks according to one implementation. Some implementations of the CRP may be equipped with a fixed Rail Assembly (69) rather than individual rails. One useful feature of the CRP may be a set of Rack Rail Forks (70), which can be mounted to the Vertical Trolley (26). These Rack Rail Forks can be equipped with a set of Slots (71), said Slots (71) engaging with some feature of the Rail Assembly (69), in this case a pair of Rail Cross Struts (72). In use, the Rail Assembly (69) can be stored or transported vertically once it's been slid into the Slots (71) in the Rail Rack Forks (70).

Figure 10:
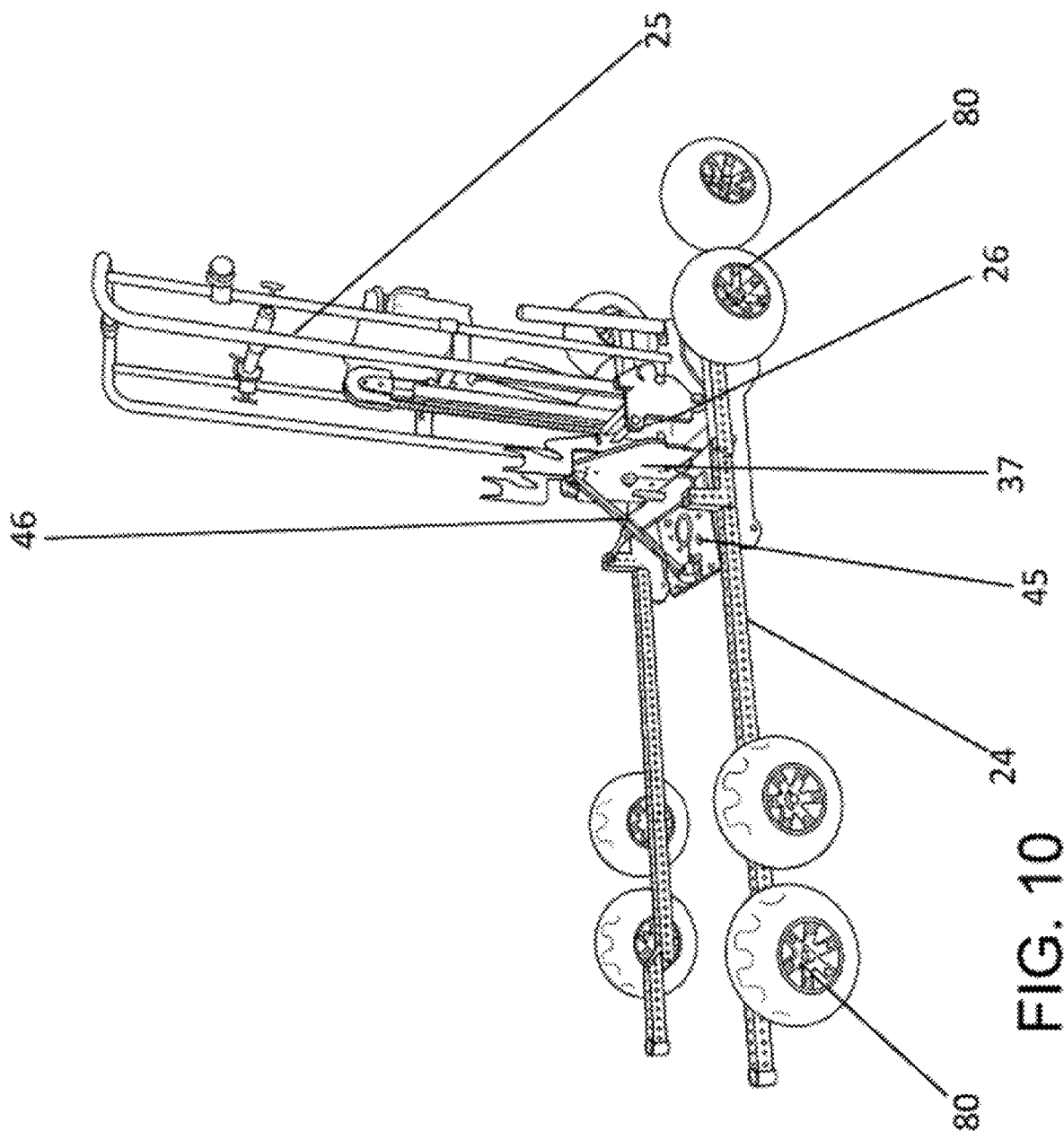
FIGS. 10 and 11 are images of prototypes of a camera rail positioner according to two implementations.
Figure 11:
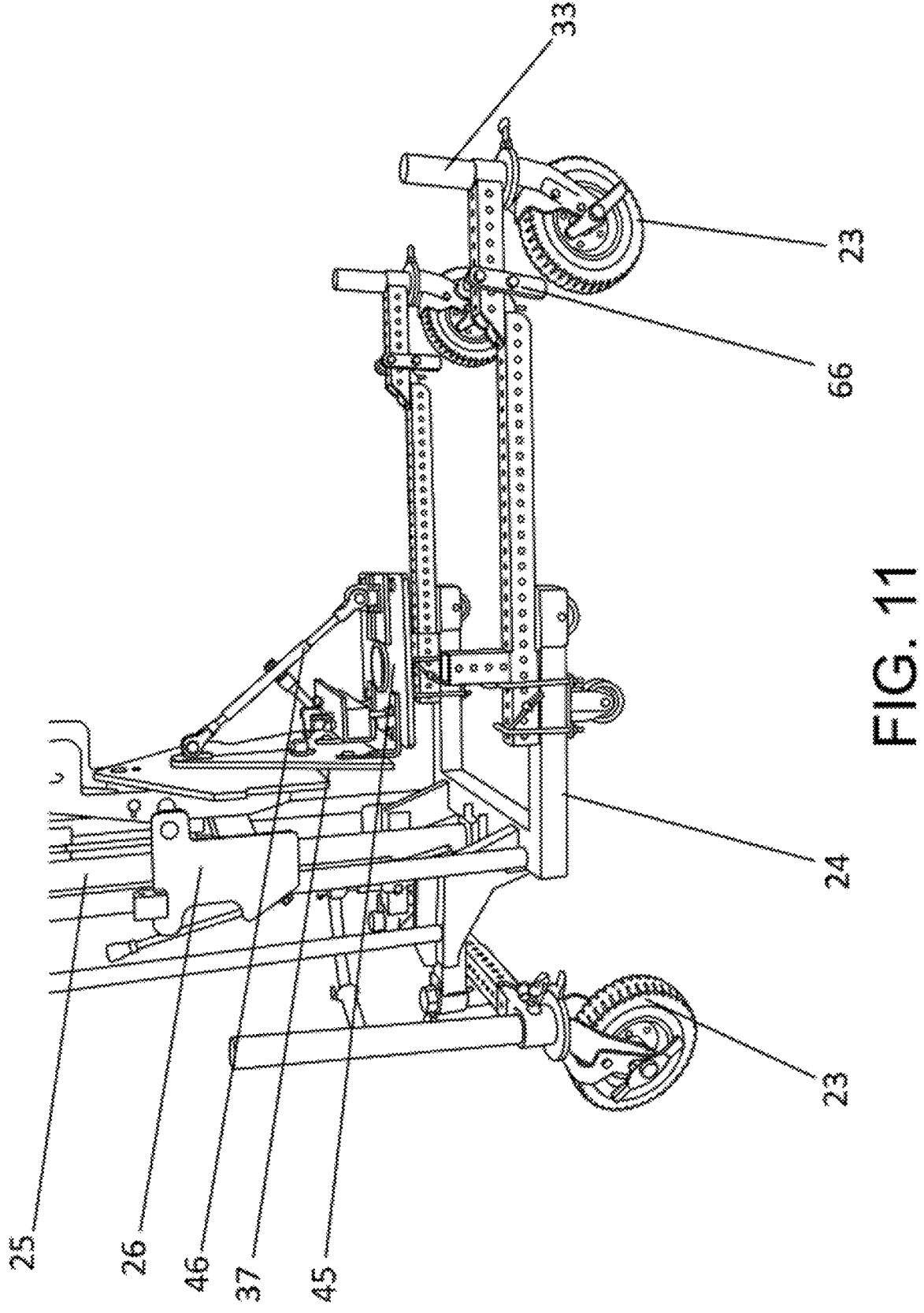

FIGS. 10 and 11 show prototype examples of the CRP according to two implementations. The version shown in FIG. 10 has four pairs of wheels (80) instead of casters for providing increased contact with the ground when traversing uneven terrain, while the version in FIG. 11 has four casters (23) connected to risers (33) similar to those introduced in previous figures, which allow for vertical movement of the casters on uneven surfaces. FIG. 11 also features pivot lock side plates (66) which can be advanced to limit pivotable movement of the casters (23). In both FIGS. 10 and 11 we can see previously introduced features, including the legs (24), tower (25), vertical trolley (26), roll plate (37), tongue (45), and load binder (46).

Components described in the disclosure can be manufactured from materials such as metal or metal alloy using known metal fabrication techniques such as CNC machining. One or more parts can also be manufactured through known plastic manufacturing techniques such as injection molding; other materials such as natural or synthetic rubber are possible for components such as wheels.

The disclosure also features methods of operating any implementation of the camera rail positioners featured herein or any subset of components of such camera rail positioners, including but not limited to those featured in the drawings and preceding description. The methods include adjusting one or more of the horizontal position, vertical position, tilt, and roll of a camera rail system by operating any of the featured camera rail positioners or components.

The present disclosure has described particular implementations having various features. In light of the disclosure provided above, it will be apparent to those skilled in the art that various modifications and variations can be made without departing from the scope or spirit of the disclosure. One skilled in the art will recognize that the disclosed features may be used singularly, in any combination, or omitted based on the requirements and specifications of a given application or design. When an implementation refers to "comprising" certain features, it is to be understood that the implementations can alternatively "consist of" or "consist essentially of" any one or more of the features. Other implementations will be apparent to those skilled in the art from consideration of the specification and practice of the disclosure.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the disclosure fall within the scope of the disclosure. Further, all of the references cited in this disclosure including patents, published applications, and non-patent literature are each individually incorporated by reference herein in their entireties and as such are intended to provide an efficient way of supplementing the enabling disclosure as well as provide background detailing the level of ordinary skill in the art.

The invention claimed is:

1. An apparatus comprising:

a pair of horizontal members disposed parallel to each which serve as a base of the apparatus;

a vertical tower in communication with and projecting upward from one or both of the pair of horizontal members;

a fixed rail assembly comprising a pair of rails in parallel to each other and one or more struts connecting the pair of rails perpendicularly;

a vertical trolley designed for slidable movement up and down a length of the vertical tower by an actuator, the vertical trolley having one or more slots which are designed to receive the one or more struts of the fixed rail assembly and hold the fixed rail assembly vertically.

2. The apparatus of claim 1, wherein the actuator is a winch, jack, hydraulic or pneumatic cylinder, drive screw or motor.

3. The apparatus of claim 1, wherein the one or more slots are provided by forked members extending vertically from the vertical trolley.

\* \* \* \* \*